(12) United States Patent
Zhang et al.

(10) Patent No.: US 9,042,937 B2
(45) Date of Patent: May 26, 2015

(54) UPLINK POWER CONTROL

(71) Applicant: NEC Laboratories America, Inc., Princeton, NJ (US)

(72) Inventors: Honghai Zhang, Seattle, WA (US); Narayan Prasad, Wyncote, PA (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 21 days.

(21) Appl. No.: 14/093,565

(22) Filed: Dec. 2, 2013

(65) Prior Publication Data

US 2014/0087783 A1    Mar. 27, 2014

Related U.S. Application Data

(62) Division of application No. 13/617,766, filed on Sep. 14, 2012, now Pat. No. 8,611,917.

(60) Provisional application No. 61/535,636, filed on Sep. 16, 2011.

(51) Int. Cl.
*H04B 7/00* (2006.01)
*H04W 52/14* (2009.01)
*H04W 52/08* (2009.01)
*H04W 52/10* (2009.01)
*H04W 52/24* (2009.01)

(52) U.S. Cl.
CPC ............ *H04W 52/146* (2013.01); *H04W 52/08* (2013.01); *H04W 52/10* (2013.01); *H04W 52/242* (2013.01); *H04W 52/243* (2013.01)

(58) Field of Classification Search
CPC .... H04W 52/24; H04W 52/50; H04W 52/367
USPC ................... 455/452.1, 450, 522, 422.1, 423
See application file for complete search history.

(56) References Cited

U.S. PATENT DOCUMENTS

2010/0291962 A1* 11/2010 Kim et al. ..................... 455/522

* cited by examiner

*Primary Examiner* — Nghi H Ly
(74) *Attorney, Agent, or Firm* — Joseph Kolodka; Akitaka Kimura

(57) ABSTRACT

A method for uplink power control implemented in a wireless communications system including one or more user equipment, a serving base station, and at least one neighboring base station is disclosed. The method comprises measuring, at each user equipment, pathloss, sending, from each user equipment to the serving base station, the pathloss, and determining, at the serving base station, uplink transmit power based on the pathloss. Other methods, systems, and apparatuses also are disclosed.

15 Claims, 3 Drawing Sheets

UPLINK POWER CONTROL

RELATED APPLICATION INFORMATION

This application is a divisional of co-pending patent application Ser. No. 13/617,766, filed Sep. 14, 2012, which in turn claims priority to provisional application No. 61/535,636, filed Sep. 16, 2011, the contents of both of which are incorporated herein by reference

BACKGROUND OF THE INVENTION

The present invention relates generally to wireless communications, and more particularly, to long term evolution LTE and long term evolution advanced LTE-A uplink UL power control.

In LTE and LTE-Advanced systems, uplink power control is crucial to reduce the interference and improve system throughput. 3GPP has defined fractional power control (FPC) to control the uplink transmission power. The major issue is that the interference created at neighboring cells highly depends on the users scheduled in the present cell. As a result, signal-to-interference-noise-ration SINR estimation, user scheduling, and modulation and coding scheme MCS selection become challenging in neighboring cells.

There has been a proposal to compensate the transmit power by a fraction of the difference between the pathloss to the serving cell and that to the second strongest cell. Another technique proposed to continuously adjust the transmission power to maintain a target total interference power a user creates to the entire system. However, the individual interference a user creates to a given neighboring cell may still be highly variable and heavily dependent on the user that is scheduled in the present cell.

Accordingly, there is a need for improved LTE and LTE-A uplink power control.

BRIEF SUMMARY OF THE INVENTION

The present invention is directed to a method for long term evolution LTE uplink power control for communications between a plurality of both eNodeB and user equipment UE, the method includes measuring by user equipment UE downlink pathloss which is sent to an eNodeB that determines uplink UL transmit power based on the downlink pathloss, under an open loop power control that is selected; and measuring by a neighboring eNodeB interference power on each resource block that is sent to a serving eNodeB, the serving eNodeB computing an average interference power for each scheduled user and determines a most strongly interfered neighbor eNodeB by each UE, setting a power adjustment based on a target interference and an average maximum interference power, updating the power adjustment if a UE is not sufficiently scheduled and setting an uplink transmit power, under a closed loop power control that is selected.

These and other advantages of the invention will be apparent to those of ordinary skill in the art by reference to the following detailed description and the accompanying drawings.

DETAILED DESCRIPTION

The present invention is directed to uplink power control for LTE and LTE-A that includes open-loop and closed-loop power control aspects to simultaneously bring down the average and the variance of the interference power in neighboring cells. Reducing the average interference increases the signal-to-noise-interference-ratio SINR values in neighboring cells. Also reducing the variance of the interference enables more accurate estimation of SINR values and the modulation and coding scheme MCS selection. Together they improve the system throughput significantly.

The inventive uplink power control for LTE and LTE-A obtains a 7-8% average user throughput improvement without sacrificing cell-edge user throughput in a network with low penetration loss and they obtain 4-6% gain on the average user throughput and 15-23% gain on the cell-edge throughput, all compared to the 3GPP FPC scheme.

Figure 1A:
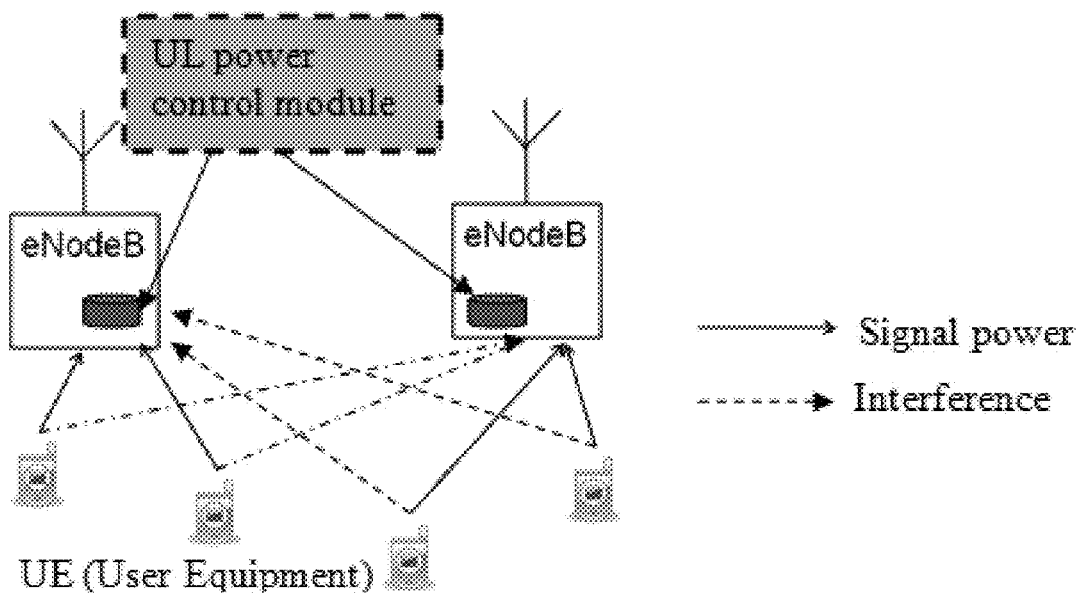
FIG. 1A shows the uplink power control for LTE and LTE-A, in accordance with the invention.

Referring to FIG. 1A, there is shown an exemplary diagram of the inventive uplink power control for LTE and LTE-A. An exemplary UL power control module is responsive to power signals and interferences between eNodeBs and user equipment UE units.

Figure 2A:
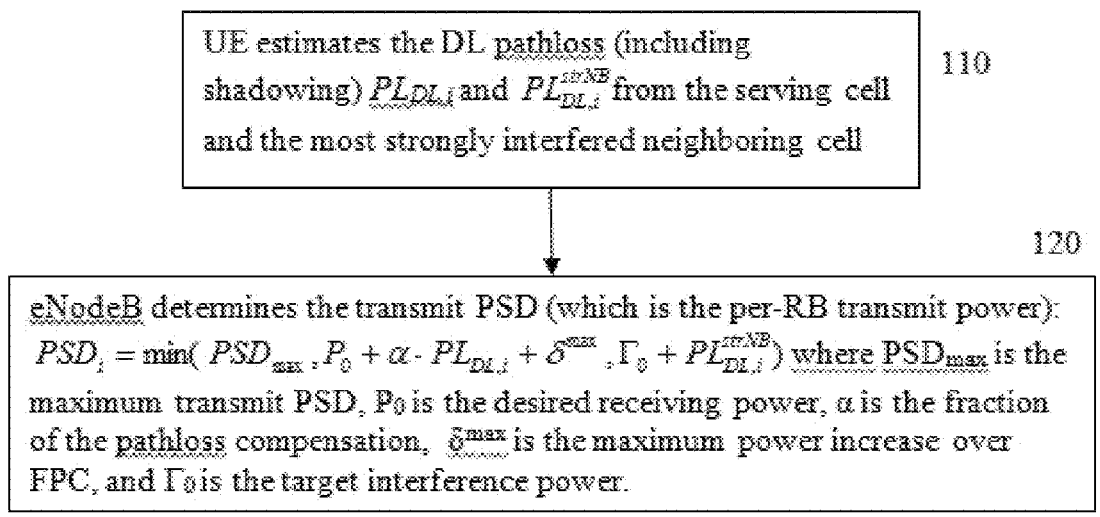
FIG. 2A is a block diagram of the open loop aspect shown in FIG. 1A, in accordance with the invention.
Figure 4A:
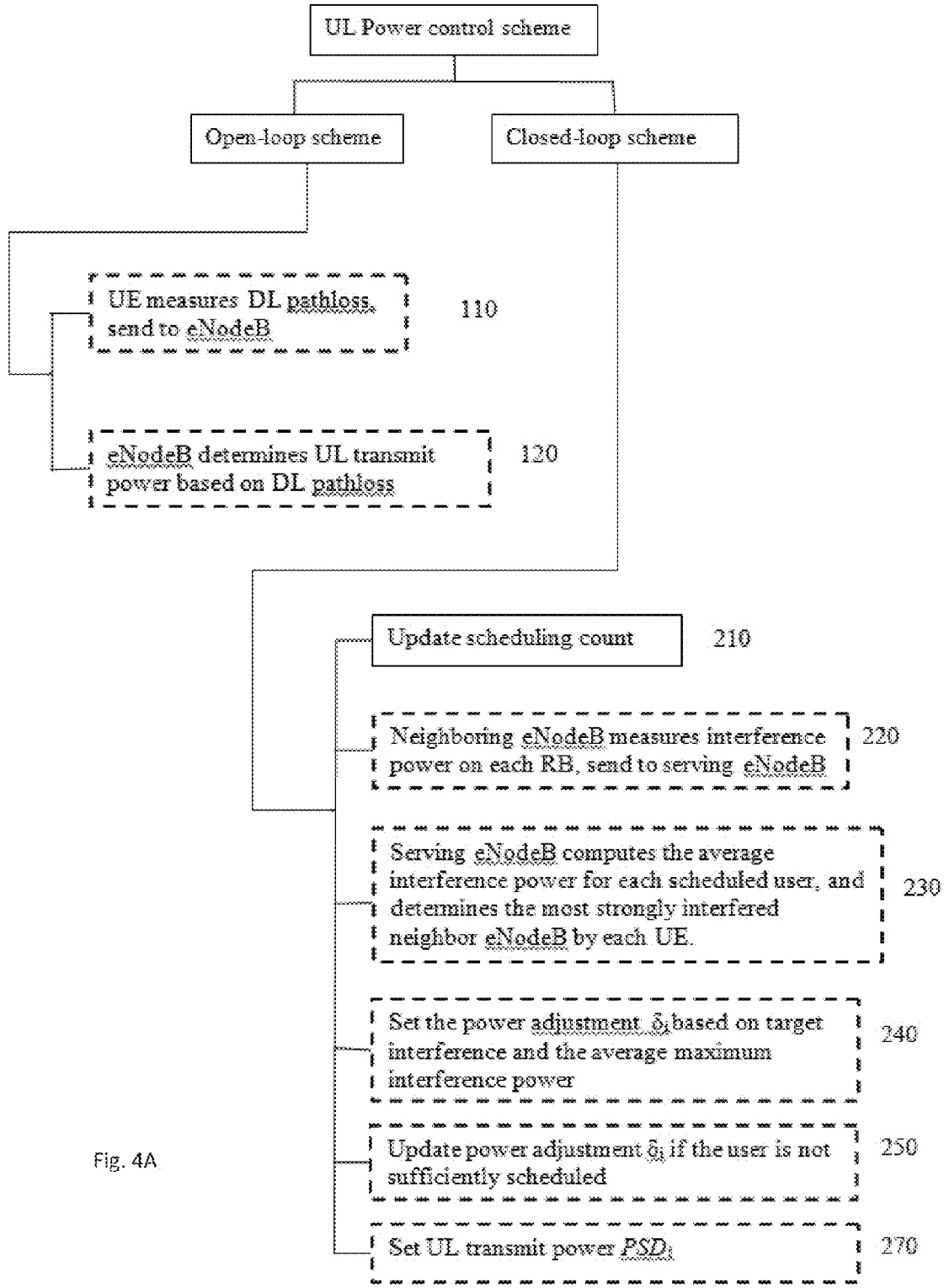
FIG. 4A is a block diagram of the steps of the uplink power control for LTE and LTE-A, in accordance with the invention.

The inventive uplink power control includes open loop steps, shown in block diagrams of FIGS. 2A and 4A. The user equipment UE estimates downlink DL pathloss (including shadowing) $PL_{DL,i}$ and $PL_{DL,i}^{strNB}$ from the serving cell and the most strongly interfered neighboring cell, respectively 110. The eNodeB determines the transmit PSD (which is the per-RB transmit power):

$$PSD_i = \min(PSD_{max}, P_0 + \alpha \cdot PL_{DL,i} + \delta^{max}, \Gamma_0 + PL_{DL,i}^{strNB}),$$

where $PSD_{max}$ is the maximum transmit PSD, $P_0$ is the desired receiving power, $\alpha$ is the fraction of the pathloss compensation, $\delta^{max}$ is the maximum power increase over FPC, and $\Gamma_0$ is the target interference power 120.

Figure 3A:
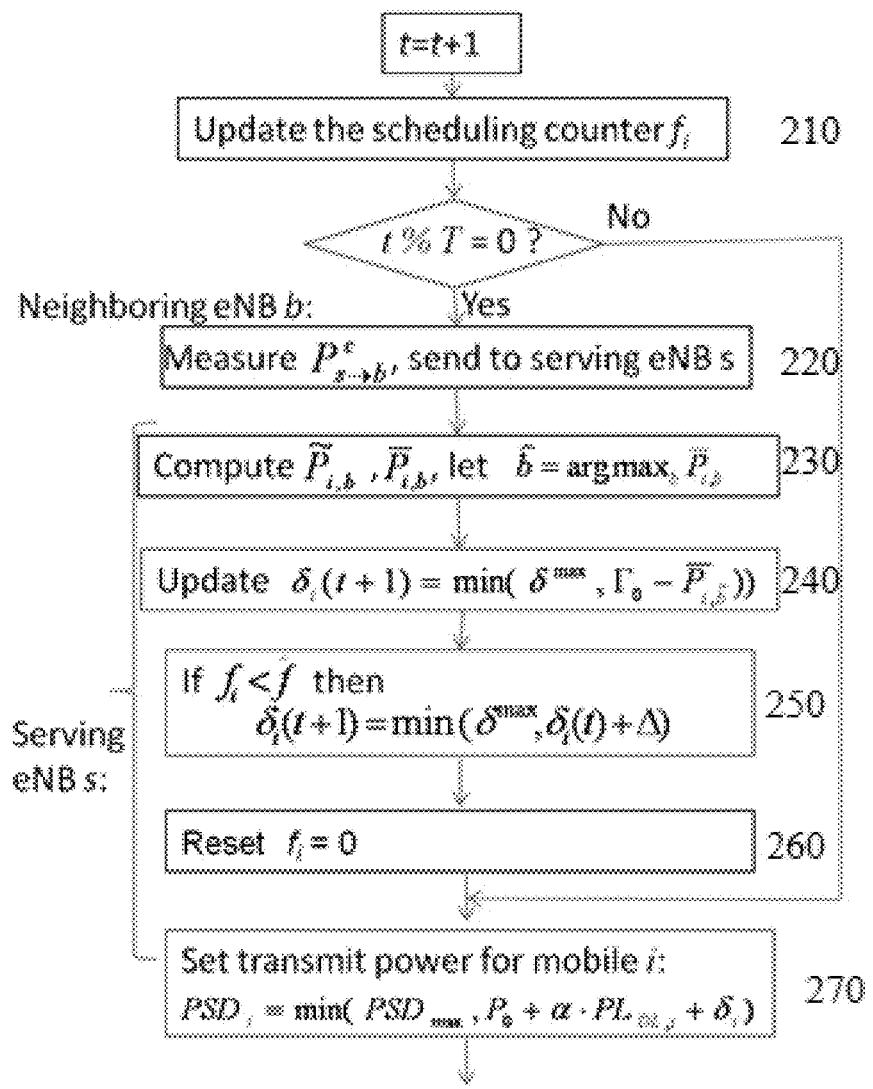
FIG. 3A is a block diagram of the closed loop aspect shown in FIG. 1A, in accordance with the invention.

The inventive uplink power control includes closed loop steps, shown in FIG. 3A. Initially, a scheduling count $f_i$ is updated 210, and then a neighboring eNodeB measures interference power on each resource block RB, and sends it to the serving eNodeB 220 (e.g., measure $P_{s \rightarrow b}^c$, send to serving eNBs). A serving eNodeB computes the average interference power for each scheduled user, and determines the most strongly interfered neighbor eNodeB by each UE 230 (e.g, compute $\tilde{P}_{i,b}$, $\overline{P}_{i,b}$, let $\hat{b} = \arg\max_b \overline{P}_{i,b}$). Then there is a setting of the power adjustment $\delta_i$ based on target interference and the average maximum interference power 240 (e.g, update $\delta_i(t+1) = \min(\delta^{max}, \Gamma_0 - \overline{P}_{i,\hat{b}})$. The power adjustment $\delta_i$ is updated if the user is not sufficiently scheduled 250 (e.g., if $f_i < f$ then $\delta_i(t+1) = \min(\delta^{max}, \delta_i(t) + \Delta)$. Reset fi=0 260. Lastly, the uplink transmit power PSDi is set 270 (e.g., set transmit power for mobile i: $PSD_i = \min(PSD_{max}, P_0 + \alpha PL_{DL,i} + \delta_i)$).

This patent application also discloses the following subject matter:

1. A method for long term evolution LTE uplink power control for communications between a plurality of both eNodeB and user equipment UE, said method comprising the steps of:

measuring by user equipment UE downlink pathloss which is sent to an eNodeB that determines uplink UL transmit power based on the downlink pathloss, under an open loop power control that is selected; and measuring by a neighboring eNodeB interference power on each resource block that is sent to a serving eNodeB, the serving eNodeB computing an average interference power for each scheduled user and determines a most strongly interfered neighbor eNodeB by each UE, setting a power adjustment based on a target interference and an average maximum interference power, updating the power adjustment if a UE is not sufficiently scheduled and setting an uplink transmit power, under a closed loop power control that is selected.

2. The method of above item 1, wherein said downlink pathloss includes pathloss $PL_{DL_i}$ and $PL_{DL,i}^{strNB}$ from the serving cell and the most strongly interfered neighboring cell, respectively.

3. The method of above item 1, wherein the eNodeB determining uplink UL transmit power based on the downlink pathloss includes determining the transmit PSD, which is the per-RB transmit power.

4. The method of above item 3, wherein the transmit PSD comprises $PSD_i = \min(PSD_{max}, P_0 + \alpha \cdot PL_{DL,i} + \delta^{max}, \Gamma_0 + PL_{DL,i}^{strNB})$ where $PSD_{max}$ is the maximum transmit PSD, $P_0$ is the desired receiving power, $\alpha$ is the fraction of the pathloss compensation, $\delta^{max}$ is the maximum power increase over FPC, and $\Gamma_0$ is the target interference power.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for uplink power control implemented in a wireless communications system including one or more user equipments, a serving base station, and at least one neighboring base station, the method comprising:
   measuring, at each user equipment, pathloss;
   sending, from each user equipment to the serving base station, the pathloss; and
   determining, at the serving base station, uplink transmit power based on the pathloss,
   measuring, at said at least one neighboring base station, interference power on a resource block sent to the serving base station;
   computing, at the serving base station, an average interference power for each user equipment;
   determining, at the serving base station, a neighboring base station most strongly interfered by each user equipment; and
   setting, at the serving base station, a power adjustment based on a target interference power and an average maximum interference power.

2. The method as in claim 1, wherein the pathloss comprises downlink pathloss.

3. The method as in claim 2, wherein the downlink pathloss comprises pathloss $PL_{DL_i}$ from the serving base station and $PL_{DL,i}^{strNB}$ from the most strongly interfered neighboring base station.

4. The method as in claim 1, wherein the determination comprises:
   determining per-resource block (RB) transmit power (transmit power spectral density (PSD)).

5. The method as in claim 4, wherein the transmit PSD comprises $$PSD_i = \min(PSD_{max}, P_0 + \alpha \cdot PL_{DL,i} + \delta^{max}, \Gamma_0 + PL_{DL,i}^{strNB}),$$

where $PSD_{max}$ is maximum transmit PSD, $P_0$ is desired receiving power, $\alpha$ is a fraction of pathloss compensation, $\delta^{max}$ is a maximum power increase over fractional power control (FPC), and $\Gamma_0$ is target interference power.

6. A method for uplink power control implemented in a serving base station used in a wireless communications system including one or more user equipments and at least one neighboring base station, the method comprising:
   receiving, from each user equipment, pathloss;
   determining uplink transmit power based on the pathloss;
   computing an average interference power for each user equipment;
   determining a neighboring base station most strongly interfered by each user equipment; and
   setting a power adjustment based on a target interference power and an average maximum interference power,
   wherein each user equipment measures the pathloss, and
   wherein said at least one neighboring base station measures interference power on a resource block sent to the serving base station.

7. The method as in claim 6, wherein the pathloss comprises downlink pathloss.

8. The method as in claim 7, wherein the downlink pathloss comprises pathloss $P_{DL_i}$ from the serving base station and $PL_{DL,i}^{strNB}$ from the most strongly interfered neighboring base station.

9. The method as in claim 6, wherein the determination comprises:
   determining per-resource block (RB) transmit power (transmit power spectral density (PSD)).

10. The method as in claim 9, wherein the transmit PSD comprises $$PSD_i = \min(PSD_{max}, P_0 + \alpha \cdot PL_{DL,i} + \delta^{max}, \Gamma_0 + PL_{DL,i}^{strNB},$$

where $PSD_{max}$ is maximum transmit PSD, $P_0$ is desired receiving power, $a$ is a fraction of pathloss compensation, $\delta^{max}$ is a maximum power increase over fractional power control (FPC), and $\Gamma_0$ is target interference power.

11. A method for uplink power control implemented in a user equipment used in a wireless communications system including a serving base station and at least one neighboring base station, the method comprising:
   measuring pathloss; and
   sending to the serving base station the pathloss,
   wherein the serving base station determines uplink transmit power based on the pathloss,
   wherein said at least one neighboring base station measures interference power on a resource block sent to the serving base station,
   wherein the serving base station computes an average interference power for each user equipment,
   wherein the serving base station determines a neighboring base station most strongly interfered by each user equipment, and
   wherein the serving base station sets a power adjustment based on a target interference power and an average maximum interference power.

12. The method as in claim 11, wherein the pathloss comprises downlink pathloss.

13. The method as in claim 12, wherein the downlink pathloss comprises pathloss $PL_{DL_i}$ from the serving base station and $PL_{DL,i}^{strNB}$ from the most strongly interfered neighboring base station.

14. The method as in claim 11, wherein the determination comprises:
    determining per-resource block (RB) transmit power (transmit power spectral density (PSD)).

15. The method as in claim 14, wherein the transmit PSD comprises $$PSD_i = \min(PSD_{max}, P_0 + \alpha \cdot PL_{DL,i} + \delta^{max}, \Gamma_0 + PL_{DL,i}^{strNB}),$$

where $PSD_{max}$ is maximum transmit PSD, $P_0$ is desired receiving power, $\alpha$ is a fraction of pathloss compensation, $\delta^{max}$ is a maximum power increase over fractional power control (FPC), and $\Gamma_0$ is target interference power.

\* \* \* \* \*